United States Patent [19]
Duin

[11] Patent Number: 5,908,007
[45] Date of Patent: Jun. 1, 1999

[54] ROTATING LIVESTOCK HAY FEEDER

[76] Inventor: Robert Rudolf Duin, 30136 Rolling Hills Dr., Valley Center, Calif. 92082

[21] Appl. No.: 09/071,372

[22] Filed: Apr. 30, 1998

Related U.S. Application Data

[66] Substitute for application No. 08/531,048, Sep. 20, 1995, abandoned.

[51] Int. Cl.⁶ ..................................................... A01K 5/02
[52] U.S. Cl. ........................................ 119/51.11; 119/56.1
[58] Field of Search ............................ 119/51.04, 51.11, 119/51.13, 56.1, 57.1; 221/103, 113, 120

[56] References Cited

U.S. PATENT DOCUMENTS

| | | |
|---|---|---|
| 564,929 | 7/1896 | Hollister . |
| 747,216 | 12/1903 | Pedersen . |
| 911,674 | 2/1909 | Olsen . |
| 1,315,879 | 9/1919 | Stoltz et al. . |
| 2,766,905 | 10/1956 | Heinig ........................................ 221/83 |
| 3,033,164 | 5/1962 | Evers ......................................... 119/54 |
| 3,155,212 | 11/1964 | Hines ......................................... 194/10 |
| 3,658,036 | 4/1972 | Caracappa ............................ 119/51.13 |
| 4,279,221 | 7/1981 | Arvizu ................................... 119/51.11 |
| 4,981,106 | 1/1991 | Nagatomo ............................. 119/51.11 |

FOREIGN PATENT DOCUMENTS

| | | | |
|---|---|---|---|
| 646365 | 6/1937 | Germany .................................. 221/82 |
| 1474779 | 10/1965 | Germany .................................. 221/82 |
| 1438669 | 11/1988 | U.S.S.R. ............................. 119/51.11 |
| 2104050 | 3/1983 | United Kingdom ................... 221/120 |

*Primary Examiner*—Robert P. Swiatek
*Attorney, Agent, or Firm*—Gene Scott-Patent Law & Venture Group

[57] ABSTRACT

An apparatus automatically dispenses measured amounts of hay on a selected schedule to livestock. A flake spool incorporates flake holders mounted radially in side-by-side pairs about a single central shaft, where each pair of flake holders is angularly spaced by 45 degrees. The flake holders are sized to each hold a single flake of hay, and have an open end farthest from the shaft. The flake spool is contained within a cylindrical outer wall and rotates on the shaft. A control circuit and a drive motor enable flake rotation. The control circuit is programmable for a desired schedule for rotation of the device for dropping the hay flakes through a dispensing door at the bottom of the outer wall whereupon they slide down on a chute for access by the farm animals.

13 Claims, 3 Drawing Sheets

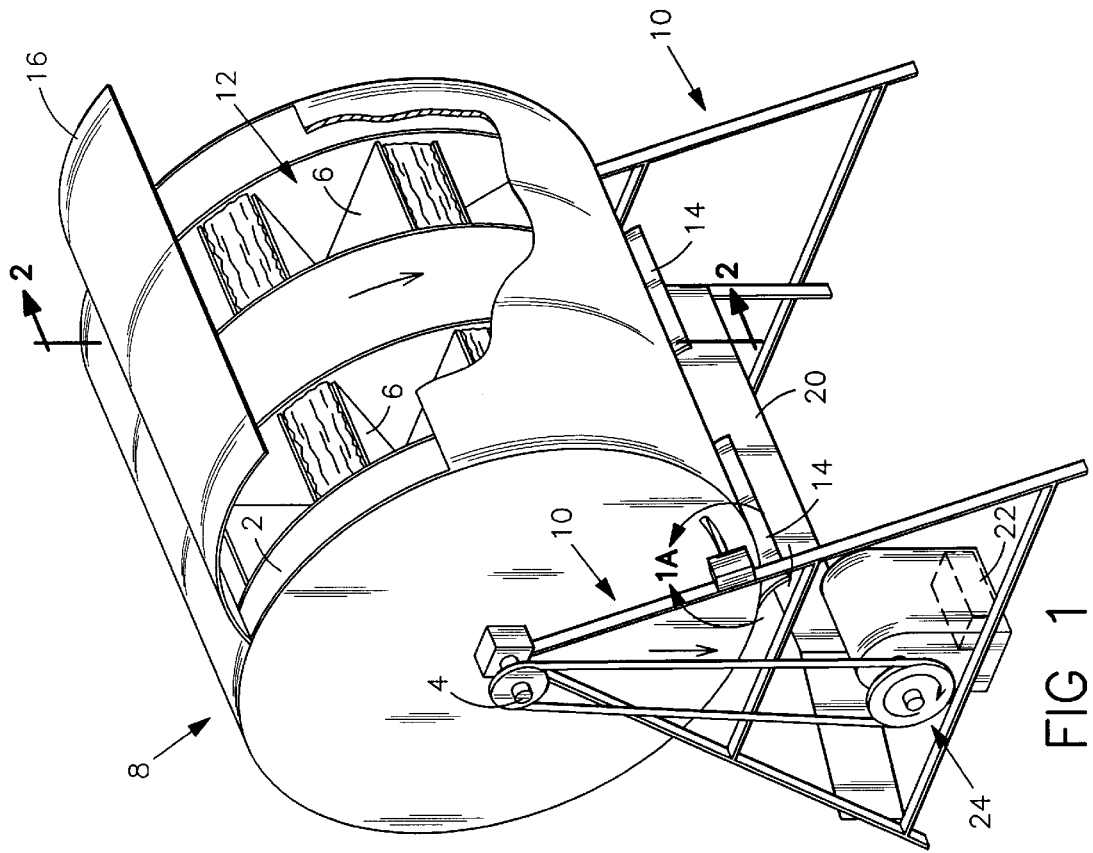
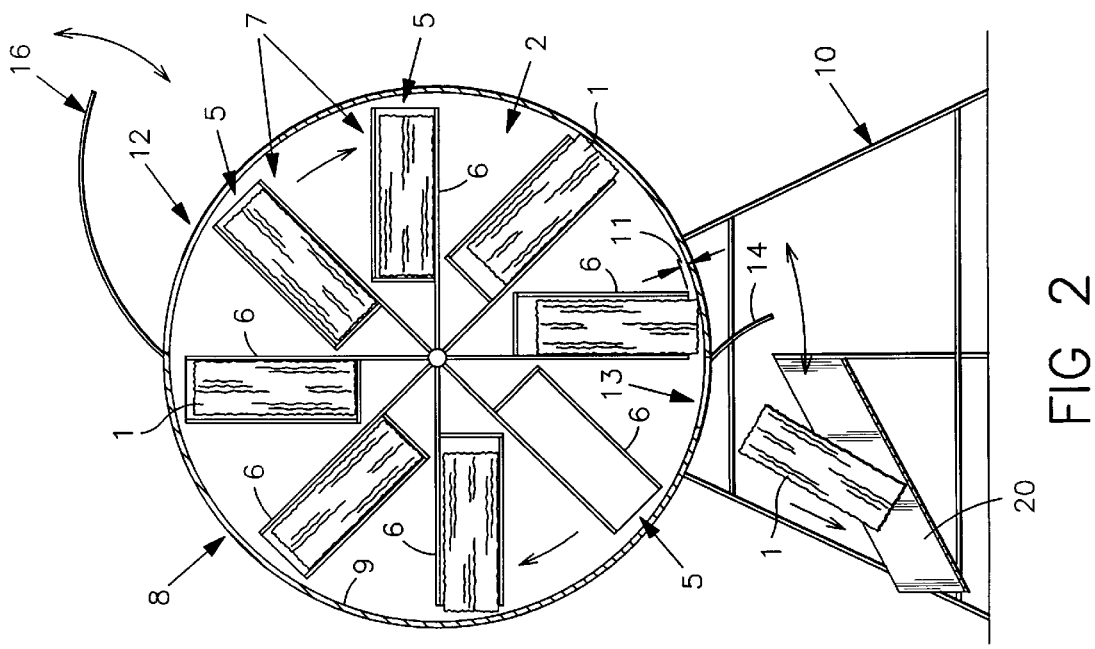

5,908,007

ROTATING LIVESTOCK HAY FEEDER

This is a substitute application for utility patent application, of Ser. No. 08/531,048, filed Sep. 20, 1995, now abandoned.

FIELD OF THE INVENTION

This invention relates generally to the field of animal feeding devices and more particularly to an automatic stock feeder for dispensing hay to large farm animals.

BACKGROUND OF THE INVENTION

Devices for automatically dispensing of a measured amount of feed on a timed schedule are needed to feed farm or ranch animals in many situations such as when those normally involved in feeding activities are not available for extended periods of time, or when it is desired to tend to animals in remote locations. In the case of farm animals it is desired to dispense feed at regular intervals and in between these intervals, to hold or store the feed in such a manner as to prevent the feed from being eaten by wild creatures. In particular and specifically in relation to the present invention, it should be noted that a feeder for hay flakes is desirable. Hay flakes are small bales of hay formed into a rectangular shape and providing an amount of feed necessary for sustaining cattle and horses during one feeding period. The need for timed or regulated feed devices has been confirmed by the many devices that have appeared on the market or are described in the literature and other publications.

Several prior art devices that are most pertinent to the present invention have been built to provide pre-measured amounts of food to animals automatically on a timed schedule. One such device disclosed in U.S. Pat. No. 3,658,036 to Caracappa, has multiple compartments arranged radially about a vertical axis, each compartment having its own trap door on hinges. This device also has a holding finger for each compartment to hold the trap door closed until a rotating disc is aligned so as to release the finger and permit the door to drop and release the food from that compartment. The hinged trap doors and holding fingers for all of the compartments, however, comprise many moving parts thus making the device overly complicated, expensive to manufacture, and subject to mechanical failure and excessive maintenance.

Another device which is disclosed in U.S. Pat. No. 4,279,221 to Arvizu shows a hopper where granulated food is stored in bulk form and from which it is gravity fed through a rotating food dispenser which is sized to measure the desired amount of food. While this invention has fewer moving parts than the preceding one, it would not be suitable for dispensing hay flakes because the hay flakes are too large.

A third device for automatically feeding animals is disclosed in U.S. Pat. No. 4,981,106 to Nagatomo. This is a battery-powered device that can dispense measured quantities of grain or other finely divided dry feed material on a set schedule. However it is basically only useful for small domestic pets such as fish or birds, because the design would not scale up to a size needed to feed adequate portions to hay eating farm animals.

Various other devices also exist for satisfying the feeding of specific animals such as hogs or fish. However, none of these satisfies the need for a means to automatically feed adequate measured quantities of hay to farm animals on a timed schedule. Clearly there is a need for a device that is designed to automatically dispense a measured amount of feed for farm or ranch animals such as horses and cattle on a selected schedule, and to have a large enough capacity for several days' worth of food. Such a device would be of a simple enough design that it would be relatively easy to manufacture and it would not be subject to frequent breakdowns, jamming or excessive preventive maintenance. Such a device would be rugged enough to be used for the feeding of large, active animals that could damage a more fragile design. The device would be versatile enough to be capable of automatic feeding of from 1 to 4 days without the need to reload the apparatus. Such a device would also have the advantages of being easily loaded, easily set as to time schedule, not easily damaged or affected by rain or snow, i.e., just as applicable for indoors as well as out of doors applications, and would prevent wild animals from attacking the stored feed. The present invention fulfills these needs and provides related advantages.

SUMMARY OF THE INVENTION

The present invention is an apparatus for automatically dispensing measured amounts of hay on a selected schedule over a period of days to horses, cattle, and other farm or ranch animals. The apparatus is simple and rugged, yet reliable and efficient. The device is designed to handle hay flakes primarily, but could handle loose feed as well if such were placed so as to be held in place by a hay flake, for example. There are several embodiments that can handle from 4 to 16 hay flakes, and the design can easily be scaled up to handle many times that amount. The preferred embodiment consists of a flake spool in which 16 flake holders are mounted radially in side-by-side pairs about a single central shaft like the spokes of a wheel, each pair of flake holders being angularly separated from the adjacent pairs by 45 angular degrees. The flake holders are sized to each hold a single flake of hay, and have an open end farthest from the shaft, and a closed end closest to the shaft. The spool with its flake holders is thus a simple, structurally sound, and effective means for holding between 4 and 16 hay flakes in a fixed radial relationship. The flake spool is contained within a cylindrical outer wall such that the spool can rotate on the shaft with a small clearance between the open ends of the flake holders and the inside surface of the outer wall. The outer wall provides shelter to the hay flakes from the weather and protection from wild animals. The spool is caused to rotate by a control means and a drive means that is connected to the shaft. A loading door is provided in the upper surface of the cylindrical outer wall for ease of placing hay flakes into the flake holders as the spool is stepped around. A simple and rugged electrical circuit is provided for setting a desired schedule for rotation of the device for dropping the hay flakes through a dispensing door at the bottom of the outer wall whereupon they slide down on a chute for access by the farm animals. The circuit has a "jog" feature for positioning the device for accepting the loading of new flakes, and is adaptable to any selected feed schedule. A sensing switch provides positive feedback of the position of the flake holders so that positional error is avoided by misalignment. Preferably, the flake spool is positioned at an angle with respect to the horizontal so that when a hay flake drops through the dispensing door and onto the chute, the flake tends to fall to one side rather than onto its end. Alternately, the spool may be placed in horizontal alignment and the chute may be angled with respect to the horizontal, or both the chute and the spool may be angled with respect to the horizontal. This inventive feature of the present invention provides significant advantages, as more animals may simultaneously feed from a hay flake positioned horizontally on one side rather than vertically on end.

BRIEF DESCRIPTION OF THE DRAWINGS

The accompanying drawings illustrate the invention. In such drawings:

FIG. 1 is a perspective illustration of the invention, illustrating an outer wall enclosing a flake spool having 16 flake holders in 8 side-by-side pairs, and also illustrating a loading door, a shaft mounting means, a drive means, a control means, and a dispensing chute;

FIG. 2 is a left side elevation view taken generally along lines 2—2 of FIG. 1, and illustrating the outer wall, the flake spool and flake holders, the shaft mounting means and the chute.

DETAILED DESCRIPTION OF THE PREFERRED EMBODIMENT

Figure 1A:
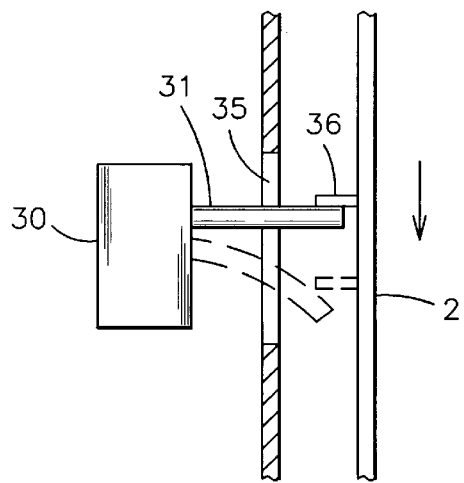
FIG. 1A is a partial view of that portion of the apparatus shown in line 1A of FIG. 1, particularly showing the means by which position sensing of the rotating barrel is accomplished.

FIGS. 1 and 2 show an apparatus for automatically dispensing a plurality of hay flakes 1 on schedule. A flake spool 2 has a center shaft 4 about which are positioned sixteen radially oriented flake holders 7 at eight fixed radial positions spaced apart by 45 angular degrees like the spokes of a wheel. At each of the eight radial positions two of the holders set in side-by-side alignment. Each of the holders 7 includes a peripheral wall 6 sized for enclosing one of the flakes, and having an open end 5 sized for passing a flake 1 therethrough such that a flake 1 may be loaded into any one of the holders 7, and may be subsequently dispensed therefrom.

A shell-like outer wall 8 encloses the flake spool 2 and is supported by a shaft mounting means 10 and for engaging the center shaft 4 in rotational interrelationship. A small space 11 separates the open ends of the flake holders 7 and the inside surface 9 of the outer wall 8 thereby allowing the spool 2 to rotate within the wall 8 and restraining the flakes 1 from falling out of the holders 7 prematurely. The wall 8 includes a loading aperture 12 facing upward for receiving the flakes 1 from a position above the apparatus, and a pair of dispensing apertures 13 facing downward for passing the flakes 1 out of the outer wall 8 in a dispensing chute 20.

A loading aperture cover 16 is preferably provided for covering the loading aperture 12 as desired to further enclose the outer wall 8 against natural elements. Loading of a flake into a holder 7 is facilitated when the holder 7 is properly aligned with the loading aperture 12, the loading aperture cover 16 being in the open position.

A pair of dispensing aperture covers 14, are provided for covering the dispensing apertures 13, one cover 14 for each aperture, as desired for further enclosing the outer wall 8 during loading of the flakes into the apparatus. One or both of the covers 14 are opened for dispensing the flakes 1. Dispensing of a flake 1 from a holder 7 occurs when the holder 7 is properly aligned with the relevant dispensing aperture 13 and the associated dispensing aperture cover 14 is in the open position. A dispensing chute 20 is provided. It has an angled upfacing surface (not visible in the figures) that is positioned and sized for receiving each one of the flakes 1 as the flakes 1 drop from the holder 7 through one of the dispensing apertures 13 and facilitates the flakes to slide down, by the force of gravity, into a position for feeding animals.

Figure 4:
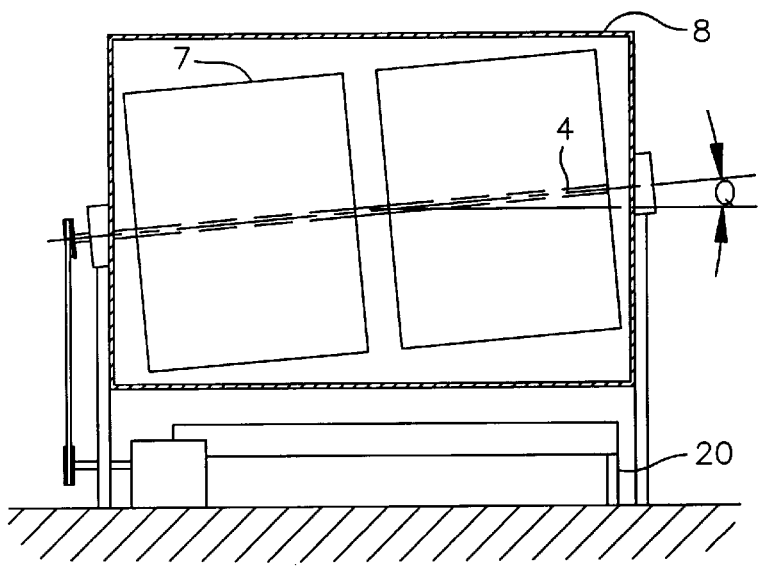
FIG. 4 is a cross-sectional view of the invention, particularly illustrating the flake spools schmatically, wherein they have a center shaft tilted at an angle with respect to the horizontal.
Figure 5:
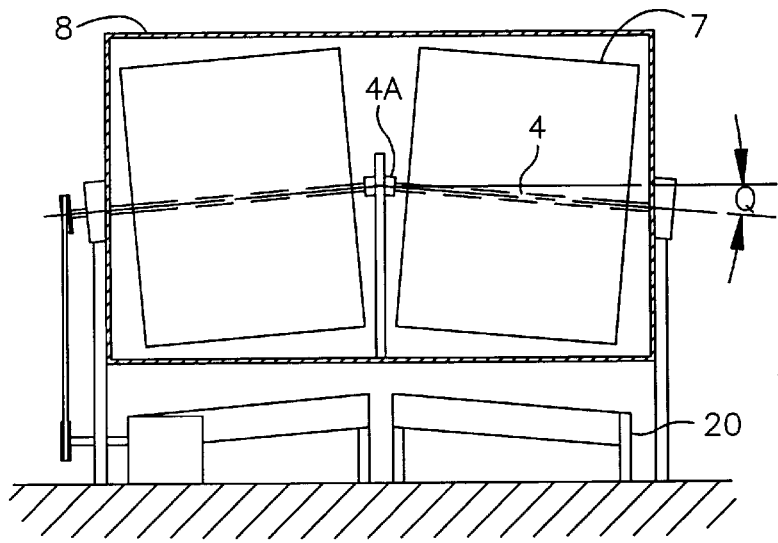
FIG. 5 is a cross-sectional view similar to that of FIG. 4, particularly illustrating one of the center shafts tilted at a positive angle with respect to the horizontal and the other of the center shafts tilted at a negative angle with respect to the horizontal, and the shafts joined together by a flexible coupling.
Figure 6:
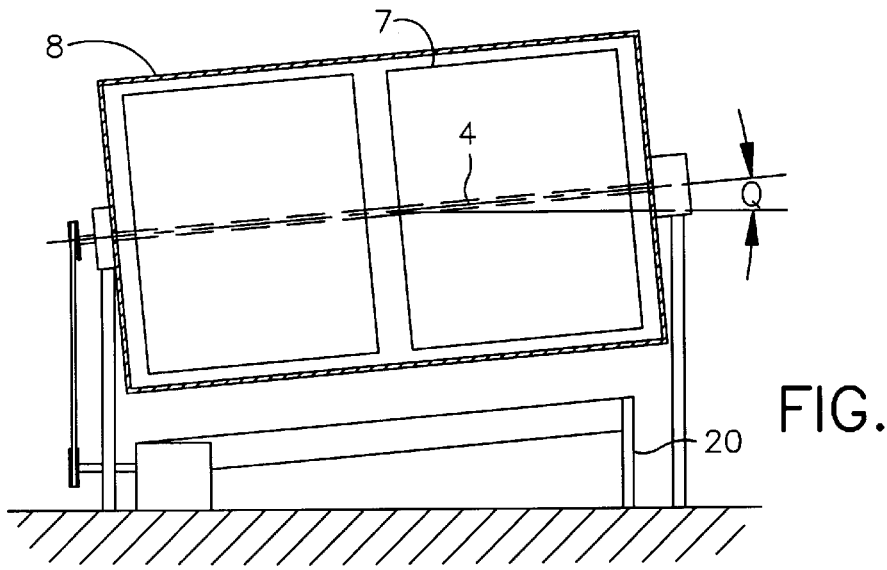
FIG. 6 is a cross-sectional view similar to that of FIG. 4, particularly showing both the flake spools and the outer wall tilted at an angle with respect to the horizontal.

It is desirable that the flakes are dispensed into position for feeding in a generally horizontal position resting on one side, as this allows more animals to simultaneously access the hay flake 1. There are several ways to ensure that the flake 1 rests on a side surface rather than an end surface. In one preferred embodiment, illustrated in FIG. 4, the center shafts 4 are positioned at an angle, alpha, which is preferably in the range of about 5 degrees with respect to the horizontal, thus tilting the flake holders 7 at the same angle and biasing the flakes I to fall onto one side rather than an end. FIG. 5 illustrates an embodiment in which one of the center shafts 4 is tilted at a positive angle with respect to the horizontal, and at least one other of the center shafts is tilted at a negative angle with respect to the horizontal, the angles each being about 5 degrees. To accommodate such a configuration, the center shafts 4 are joined together by a flexible coupling 4A supported by a vertical rod. Such a flexible coupling could be a simple elastomeric sleeve, or a universal joint or other well known means for accomplishing the same result. In both of these embodiments, the shell-like outer wall 8 is positioned in horizontal alignment. However, in the embodiment illustrated in FIG. 6, both the outer wall 8 and the shafts 4 are tilted at an angle with respect to the horizontal. In an alternate embodiment, the shafts 4 are in horizontal alignment and the dispensing chutes 20 are tilted with respect to the horizontal. To even further bias the hay flakes 1 to fall onto one side, both the chutes 20 and the shafts 4 may be tilted with respect to the horizontal, as illustrated in FIGS. 4–6. It should be noted that in all of these embodiments, the shafts 4 and the chutes 20 need be tilted only approximately 5° in order to ensure that the hay flake 1 falls in the desired orientation. A drive means 24, as for example an electric motor driven belt or a chain drive, or preferably a directly coupled drive means such as a motor driven worm gear drive, is coupled to the shaft 4 for rotation of the shaft 4 and the attached flake holders 7 to position each of the flake holders 7 alternately in a first upwardly oriented position for loading one of the flakes 1 therein, and in a second downwardly oriented position for dispensing one of the flakes 1, the flake holders 7 moving circularly within the outer wall 8 as the shaft 4 rotates. During this time the inner surface of the outer wall 8 is in contact with all flakes in downwardly oriented flake holders 7 to keep them from falling from their respective flake holders 7 until reaching the dispensing aperture 13.

A control means 22, as for example a computer controlled circuit, is provided for activating the drive means 24 so as to position the shaft 4 and the attached flake holders 7 appropriately for dropping the flakes through the dispensing apertures 13 into the chute 20 in accordance with a selected schedule, and for aligning the flake holders 7 consecutively with the loading aperture 12 for loading flakes 1 into the holders 7.

The apparatus as described may be filled with flakes 1 for time scheduled feeding of animals by dropping the flakes 1 over a selected period of time, into the chute 20 from which the flakes are then positioned for feeding by the animals.

Figure 3:
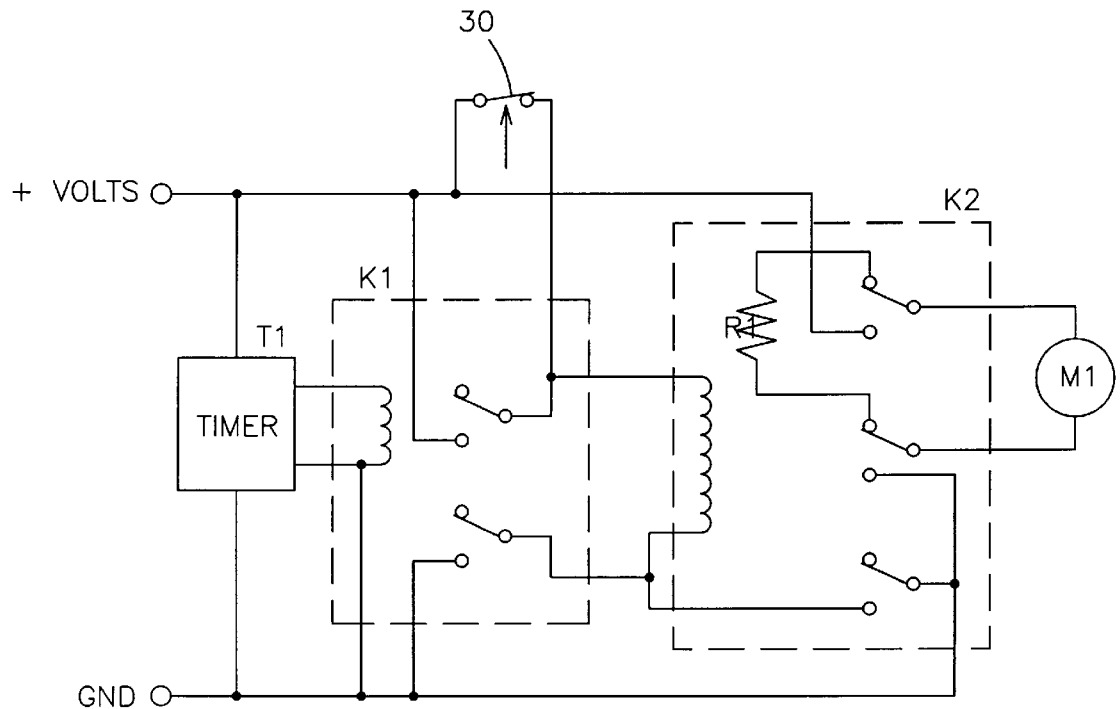
FIG. 3 is a schematic diagram of an electrical circuit of the invention.

This is accomplished by positioning an electrical switch 30, electrically a part of the control means 22, as shown in FIGS. 1 and 3, so as to sense the position of the flake spool 2. Switch 30 includes a flexible extension finger 31 extending therefrom through a slot 35 in outer wall 8 into a position within the apparatus whereby as the flake spool 2 rotates, small tabs 36 which are attached to, and move with the flake spool 2 are forced thereby to contact the extension finger 31 for activating the switch 30. It is clear that the tabs 36 may be placed at appropriate radial positions so that each time a tab 36 actuates the switch 30, a corresponding flake holder 7 has arrived at an appropriate position for dispensing a flake 1 through the aperture 13. The control means 22 could be set-up to provide a jostling back and forth type rotational motion around the appropriate dispensing position in order to help dislodge a flake 1 that may be reluctant to drop out of the flake holder 7. Such a motion would include very small back and forth rotations in quick succession. Drive and switching power for the operation of the present apparatus could be supplied by standard AC power circuits when the apparatus is used in doors or where it may be provided with such power supply wiring. In remote applications, the apparatus is powered by low voltage DC power supplied by batteries. Such batteries could be replenished on a continuing basis by common solar energy collection panels such as photovoltaic cells converting sunlight energy directly into electrical current for storage in, as for example, common, automotive 12 VDC storage batteries. Whatever the source and type of power used, it is intended herein that the apparatus for providing such power is to be considered as a part of the control means 22 of the invention. FIG. 3 is an electrical schematic diagram showing one possibility for a simple means for driving the flake spool 2 between positions for dispensing the flakes 1. In this circuit, timer T1 closes relay K1 momentarily at a time for feeding. Relay K1 closes relay K2 placing motor M1 into the circuit and locking relay K2 in the actuated state. The flake spool 2 continues to rotate until one of the tabs 36 opens switch 30, at which time relay K2 is deenergized. At this time motor M1 is reestablished across braking resistor R1 so that rotational overshoot is minimized.

While the invention has been described with reference to a preferred embodiment, it is to be clearly understood by those skilled in the art that the invention is not limited thereto. Rather, the scope of the invention is to be interpreted only in conjunction with the appended claims. Although the described invention is primarily designed as a livestock feeder, other embodiments could be used for feeding domestic or wild animals such as, for example, deer, moose, birds, and the like.

What is claimed is:

1. An apparatus for automatically dispensing a plurality of hay flakes on schedule comprising:

a flake spool having a center shaft about which are fixedly positioned a plurality of radially oriented flake holders substantially equally spaced as the spokes of a wheel, each of the holders including a peripheral wall sized for enclosing one of the flakes, an open end of the peripheral wall sized for passing a flake therethrough such that a flake may be loaded into any one of the holders, and may be subsequently dispensed therefrom;

a shell-like, fixedly positioned, outer wall enclosing the flake spool and including shaft mounting means for engaging the center shaft in rotational interrelationship thereto, the center shaft positioned at an angle with respect to the horizontal, thereby tilting the flake holders at the same angle, the wall including an upfacing loading aperture for receiving the flakes from a position above the apparatus, and a down facing dispensing aperture for dropping the flakes out of the holders in order to feed animals;

a dispensing aperture cover adapted for removably covering the dispensing aperture as desired for further enclosing the outer wall during loading of the flakes into the apparatus;

a dispensing chute providing an angled upfacing surface positioned and sized for receiving each one of the flakes as the flakes drop through the dispensing aperture and for slidably conducting the flakes into a position for feeding animals;

a drive means coupled to the shaft for rotation thereof for positioning each of the flake holders alternately in a first upwardly oriented position for loading one of the flakes therein, and in a second downwardly oriented position for dispensing one of the flakes, the flake holders moving circularly within the outer wall as the shaft rotates, the flakes being positioned in the flake holders at the angle of the shaft with respect to the horizontal; and a control means for activating the drive means so as to position the shaft for dropping the flakes in accordance with a selected schedule, and for aligning the flake holders consecutively with the loading aperture for loading the flakes into the holders, the flakes being dispensed at the angle of the shaft so as to tend to fall to one side in the chute.

2. The apparatus of claim 1 wherein the flake holders are spaced apart by 90 angular degrees.

3. The apparatus of claim 1 wherein the flake holders are spaced apart by 45 angular degrees.

4. The apparatus of claim 1 wherein the chute is positioned at an angle with the horizontal so as to aid the flake in falling to one side in the chute.

5. The apparatus of claim 1 wherein the angle of tilt of the center shaft is approximately 5 degrees with the horizontal.

6. An apparatus for automatically dispensing a plurality of hay flakes on schedule comprising: a flake spool having a center shaft about which are fixedly positioned a plurality of radially oriented flake holders substantially equally spaced as the spokes of a wheel at fixed radial positions, two of the holders being set at each of the radial positions in side-by-side alignment, each of the holders including a peripheral wall sized for enclosing one of the flakes, an open end of the peripheral wall sized for passing a flake therethrough such that a flake may be loaded into any one of the holders, and may be subsequently dispensed therefrom; a shell-like, fixedly positioned, outer wall enclosing the flake spool and including shaft mounting means for engaging the center shaft in rotational interrelationship thereto, the wall including a pair of upfacing loading apertures for receiving the flakes from a position above the apparatus, and a pair of down facing dispensing apertures for dropping the flakes out of the outer wall in order to feed animals; a pair of loading aperture covers each being adapted for removably covering one of the loading apertures as desired for further enclosing the outer wall against natural elements; a pair of dispensing aperture covers, each being adapted for removably covering one of the dispensing apertures as desired for further enclosing the outer wall during loading of the flakes into the apparatus and for dispensing the flakes from one of the flake holders while preventing dispensing from the other of the side-by-side holders; a dispensing chute providing an angled upfacing surface positioned and sized for receiving each one of the flakes as the flakes drop through the dispensing apertures and for slidably conducting the flakes into a position for feeding animals; a drive means coupled to the shaft for rotation thereof for positioning each of the flake holders alternately in a first upwardly oriented position for loading one of the flakes therein, and in a second downwardly oriented position for dispensing one of the flakes, the flake holders moving circularly within the outer wall as the shaft rotates; and a control means for activating the drive means so as to position the shaft for dropping the flakes in accordance with a selected schedule, and for aligning the flake holders consecutively with the loading aperture for loading flakes into the holders; whereby the apparatus may be filled with flakes for time scheduled feeding of the animals by dropping the flakes, over a period of time, into the shoot for access by the animals.

7. The apparatus of claim 6 wherein the flake holders comprise two separate sets of radially arranged holders in side-by-side arrangement, within each of the sets the holders being positioned in quadrature.

8. The apparatus of claim 6 wherein the flake holders comprise two separated sets of flake holders in side-by-side arrangement, such that within each of the sets, the holders are spaced apart by 45 angular degrees.

9. An apparatus for automatically dispensing a plurality of hay flakes on schedule comprising:

a plurality of flake spools each having a center shaft about which are fixedly positioned a plurality of radially oriented flake holders substantially equally spaced as the spokes of a wheel, each of the holders including a peripheral wall sized for enclosing one of the flakes, an open end of the peripheral wall sized for passing a flake therethrough such that a flake may be loaded into any one of the holders, and may be subsequently dispensed therefrom;

a shell-like, fixedly positioned, outer wall enclosing the flake spools and including shaft mounting means for engaging the center shafts in rotational interrelationship thereto, each of the center shafts positioned at an angle with respect to the horizontal, thereby tilting the flake holders at the same angle, the wall including at least one upfacing loading aperture for receiving the flakes from a position above the apparatus, and at least one down facing dispensing aperture for dropping the flakes out of the holders in order to feed animals;

at least one dispensing aperture cover adapted for removably covering the at least one dispensing aperture as desired for further enclosing the outer wall during loading of the flakes into the apparatus;

at least one dispensing chute providing a surface positioned and sized for receiving each one of the flakes as the flakes drop through the at least one dispensing aperture and for slidably conducting the flakes into a position for feeding animals;

a drive means coupled to the shafts for rotation thereof for positioning each of the flake holders alternately in a first upwardly oriented position for loading one of the flakes therein, and in second, downwardly oriented positions for dispensing the flakes in turn, the flake holders moving circularly within the outer wall as the shaft rotates, the flakes being positioned in the flake holders at the angle of the shafts with respect to the horizontal; and a control means for activating the drive means so as to position the shafts for dropping the flakes in accordance with a selected schedule, and for aligning the flake holders consecutively with the at least one loading aperture for loading the flakes into the holders;

the flakes being dispensed at the angle of the shafts so as to tend to fall to one side in the at least one chute.

10. The apparatus of claim 9 wherein the chutes are positioned at an angle with the horizontal so as to aid the flakes in falling to one side in the chutes.

11. The apparatus of claim 9 wherein the angle of tilt of the center shafts is approximately 5 degrees with the horizontal.

12. The apparatus of claim 9 wherein the flake spools are mounted on a common center shaft.

13. The apparatus of claim 9 wherein at least one of the center shafts is tilted at a positive angle with respect to the horizontal, and at least one other of the center shafts is tilted at a negative angle with respect to the horizontal, the center shafts being joined together by a flexible coupling.

* * * * *

UNITED STATES PATENT AND TRADEMARK OFFICE
CERTIFICATE OF CORRECTION

PATENT NO : 5908007
DATED : June 1, 1999
INVENTOR(S) : Robert R. Duin

It is certified that error appears in the above-identified patent and that said Letters Patent is hereby corrected as shown below:

On title page, item 76 Inventor:
replace "Robert Rudolf Duin"
with --Robert Rudolph Duin--.

Signed and Sealed this

Twelfth Day of September, 2000

Attest:

Q. TODD DICKINSON

Attesting Officer

Director of Patents and Trademarks